(12) United States Patent
Pong (10) Patent No.: US 7,500,031 B2
(45) Date of Patent: Mar. 3, 2009

(54) RING-BASED CACHE COHERENT BUS

(75) Inventor: Fong Pong, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 550 days.

(21) Appl. No.: 11/290,940

(22) Filed: Nov. 30, 2005

(65) Prior Publication Data

US 2007/0121659 A1    May 31, 2007

(51) Int. Cl.
*G06F 3/00*   (2006.01)
*G06F 15/167*   (2006.01)

(52) U.S. Cl. .......................... 710/58; 710/52; 709/214; 711/121

(58) Field of Classification Search ................... 710/52, 710/58, 117; 709/214; 711/121
See application file for complete search history.

(56) References Cited

U.S. PATENT DOCUMENTS

| | | | |
|---|---|---|---|
| 5,485,578 A * | 1/1996 | Sweazey | 709/224 |
| 5,617,537 A * | 4/1997 | Yamada et al. | 709/214 |
| 5,841,973 A * | 11/1998 | Kessler et al. | 709/250 |
| 6,629,152 B2 * | 9/2003 | Kingsbury et al. | 719/313 |
| 6,928,520 B2 | 8/2005 | McAllister et al. | |
| 6,934,814 B2 | 8/2005 | Glasco et al. | |
| 2003/0167348 A1 * | 9/2003 | Greenblat | 709/251 |

OTHER PUBLICATIONS

Coherence Ordering for Ring-based Chip Multiprocessors, Marty et al., 2006.*

* cited by examiner

*Primary Examiner*—Khanh Dang
(74) *Attorney, Agent, or Firm*—Brake Hughes Bellermann LLP (57) ABSTRACT

Managing data traffic among three or more bus agents configured in a topological ring includes numbering each bus agent sequentially and injecting messages that include a binary polarity value from the bus agents into the ring in a sequential order according to the numbering of the bus agents during cycles of bus agent activity. Messages from the ring are received into two or more receive buffers of a receiving bus agent, and the value of the binary polarity value is alternated after succeeding cycles of bus ring activity. The received messages are ordered for processing by the receiving bus agent based on the polarity value of the messages and a time at which each message was received.

20 Claims, 9 Drawing Sheets

RING-BASED CACHE COHERENT BUS

TECHNICAL FIELD

This description relates to managing data flow among multiple, interconnected bus agents and, in particular, to a ring-based interconnect cache coherent bus.

BACKGROUND

Computer chips can contain multiple computing cores, memories, or processors, and these elements can communicate with each other while the chip performs its intended functions. In some computer chips, individual computer core elements may contain caches to buffer data communication with memories, and when the memory is shared among the computing cores, the data held in each individual core cache can be maintained in a coherent manner with other core caches and with the shared memory.

This coherence among the cache cores can be maintained by connecting the communicating elements in a shared bus architecture in which the shared bus includes protocols for communicating any changes in the contents of one cache to the contents of any of the caches. However, the speed at which such a shared bus can operate to communicate information among the agents connected to the bus is generally limited due to electrical loading of the bus, and this limitation generally become more severe as more agents are added to the shared bus. As processor speeds become faster and the number of shared elements increases, limitations on the communication speed on the bus impose undesirable restrictions on the overall processing capability of the chip.

SUMMARY

In a first general aspect, a method of managing data traffic among three or more bus agents configured in a topological ring includes numbering each bus agent sequentially and injecting messages that include a binary polarity value from the bus agents into the ring in a sequential order according to the numbering of the bus agents during cycles of bus agent activity. Messages from the ring are received into two or more receive buffers of a receiving bus agent, and the value of the binary polarity value is alternated after succeeding cycles of bus ring activity. The received messages are ordered for processing by the receiving bus agent based on the polarity value of the messages and a time at which each message was received.

Implementations can include one or more of the following features. For example, numbering each bus agent sequentially can include automatically determining the number of bus agents configured in the topological ring and automatically assigning a number to each bus agent. The number of bus agents can be determined during a start-up process of a system comprising the three or more bus agents. Numbering each bus agent sequentially can include reading a number from each bus agent.

Receiving messages into one or more receive buffers of the receiving bus agent can include receiving messages having a first binary polarity value into a first receive buffer and receiving messages having a second binary polarity value into a second receive buffer. Messages received during one cycle of bus ring activity can be extracted from the first receive buffer and then messages received during a successive cycle of bus ring activity can be extracted from the second receive buffer.

A common clock signal can be generated, and injecting messages from the bus agents into the ring in the sequential order can include injecting messages into the ring synchronously with the common clock signal. Messages also can be injected asynchronously from the bus agents into the ring in the sequential order. Ordering the received messages for processing by the receiving bus agent can include ordering messages having a first polarity value received during two successive cycles of bus ring activity before messages having a second polarity value received during the successive cycles of bus ring activity. The messages received by each bus agent can e ordered in the same order. The at least three bus agents can include a processor and a local cache. The bus agents can be located in a system-on-a-chip.

In anther general aspect, a system includes three or more bus agents interconnected in a topological ring configured to deliver messages between bus agents, and each bus agent includes an output queue configured for buffering messages to be injected into the ring for transmission to other bus agents, a first input queue configured to receive and buffer messages from the ring, a bus controller configured to tag a binary polarity value to messages injected into the ring, where the polarity value alternates between the binary value with succeeding cycles of bus ring activity and a processor configured to order messages received from the ring in the input queue based on the polarity value of the messages and time at which the messages were received.

Implementations can include one or more of the following features. For example, each bus agent can include a register configured to store a unique, sequential identification of the bus agent. Each bus agent can further include a register configured to store information about the number of agents connected o the bus. Each bus agent can further include a second input queue configured to receive and buffer messages from the ring, where the first input queue is configured to receive and buffer messages tagged with the first binary polarity value, and the second input queue is configured to receive and buffer messages tagged with the second binary polarity value.

Each bus agent can include a processor and a local cache. The bus agents can be located in a system-on-a-chip. The bus controller of each bus agent can be further configured to inject a message only once per cycle of bus ring activity. The bus controller of at least one bus agent can be further configured to query the bus agents connected to the ring and determine automatically the number of bus agents connected to the ring.

The details of one or more implementations are set forth in the accompanying drawings and the description below. Other features will be apparent from the description and drawings, and from the claims.

DETAILED DESCRIPTION

Figure 1:
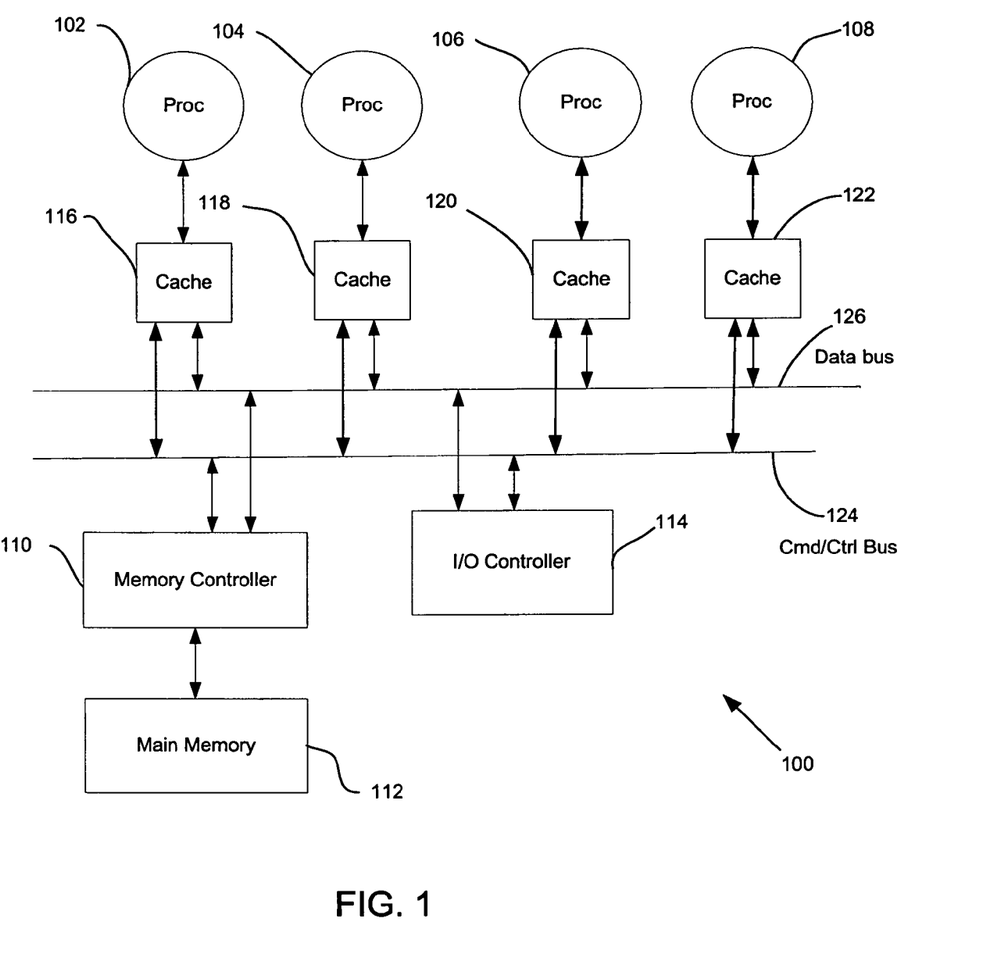
FIG. 1 is a block diagram of a system on a single integrated circuit having multiple processors that are connected by a bus.

FIG. 1 is a block diagram of a multi-core System on a Chip ("SOC"). The chip 100 includes four processing elements 102, 104, 106, and 108. Each of the processing elements can be a central processing unit ("CPU") core, a digital signal processor ("DSP"), or another data processing module. The various processing elements 102, 104, 106, and 108 may be identical or different. For example, all of the processing elements 102, 104, 106, and 108 can be DSPs, or one may be a standard CPU core, while others may be specialized DSP cores.

The processing elements 102, 104, 106, and 108 are connected to a memory controller 110 that controls access to a main memory 112 (e.g., a high speed random access memory ("RAM")). The processing elements 102, 104, 106, and 108 also are connected to an input/output (I/O) processor 114 that manages input and output operations between the processing elements and external devices. For example, the I/O processor 114 may handle communications between the processing elements 102, 104, 106, and 108 and an external disk drive.

Each processing element 102, 104, 106, and 108 can be associated with a cache element 116, 118, 120, and 122, respectively, which buffers data exchanged with the main memory 112. Cache elements 116, 118, 120, and 122 are commonly used with processing elements 116, 118, 120, and 122 because the processing speed of the processing elements 102, 104, 106, and 108 is generally much faster than the speed of accessing the main memory 112. With the cache elements 116, 118, 120, and 122, data can be retrieved from memory 112 in blocks and stored temporarily in a format that can be accessed quickly in the cache elements 116, 118, 120, and 122, which are located close to the associated processing elements 102, 104, 106, and 108. The processing elements 102, 104, 106, and 108 then can access data from their associated cache elements 116, 118, 120, and 122, more quickly than if the data had to be retrieved from the main memory 112.

Communications between the processing elements 102, 104, 106, and 108, the cache elements, 116, 118, 120, and 122 and the main memory 112 generally occur over a shared bus, which can include an address and command bus 124 and a data bus 126. Although the address and command bus 124 and the data bus 126 are shown separately, in some implementations they can be combined into one physical bus. Regardless of whether the shared bus is implemented as a dual bus or a single bus, a set of protocols can be used to govern how individual elements 102-122 that are connected to the bus (i.e., "bus agents") use the bus to communicate amongst themselves.

In many cases during operation of the chip 100 the processors 102, 104, 106, and 108 operate on the same data, in which case the copy of the data retrieved from the main memory 112 and stored in the local cache element 116 associated with a processing element 102 must be identical to the copy stored in the local cache 118, 120, and 122 associated with all other processing elements 104, 106, and 108. Thus, if one processing element modifies data stored in its local cache, this change must be propagated to the caches associated with the other processing elements, so that all processing elements will continue to operate on the same common data. Because of this need for cache coherence among the bus agents, protocols are established to ensure that changes to locally-stored data made by an individual bus agent to its associated cache are communicated to all other caches associated with other bus agents connected to the bus.

Figure 2:
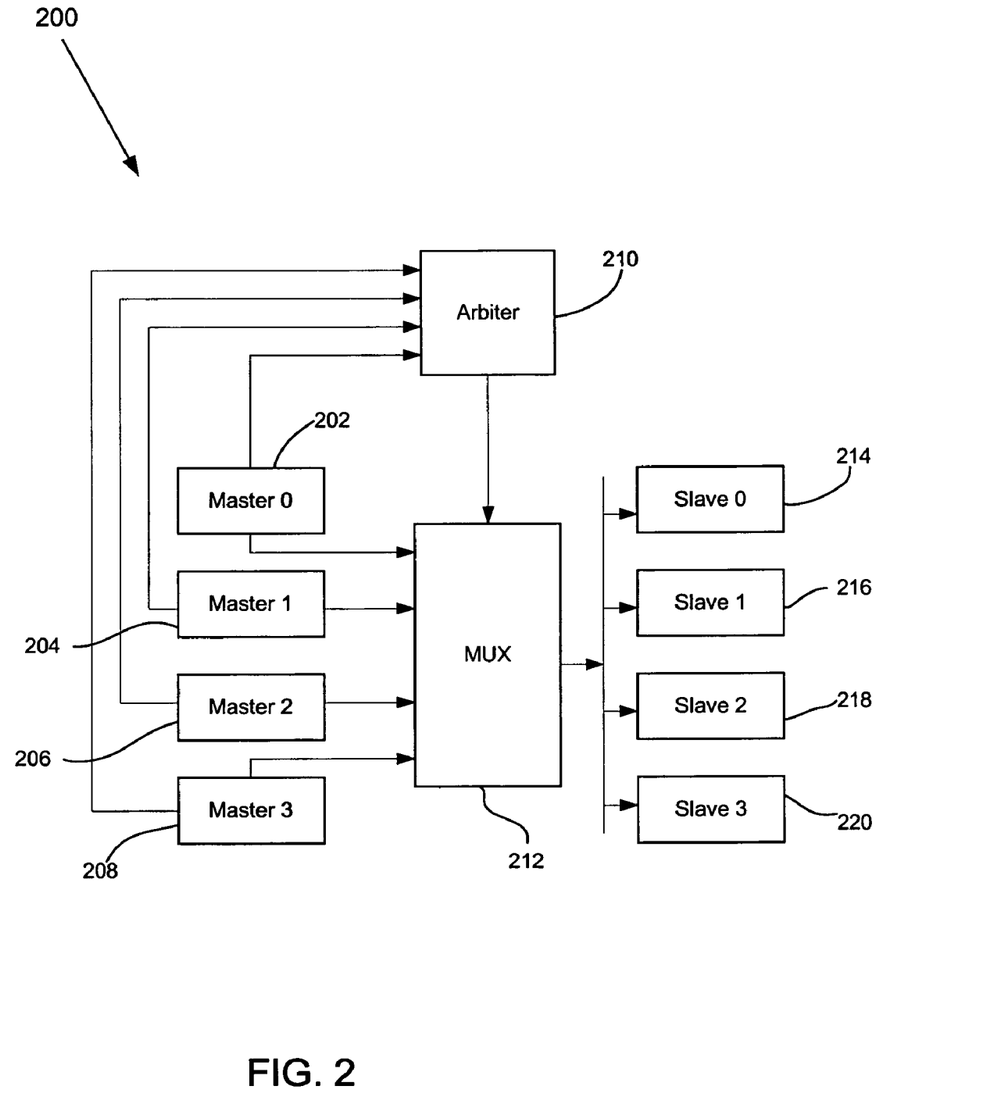
FIG. 2 is a block diagram of a shared bus design based on multiplexers.

FIG. 2 is a block diagram of a shared bus design 200 for maintaining a cache coherence among multiple bus agents. The design includes four bus "master" elements 202, 204, 206, and 208 (e.g., cache controllers corresponding to each cache 116, 118, 120, and 122), a multiplexer 212, and arbiter 210, and four "slave" elements 214, 216, 218, and 220. When a bus master needs to communicate a message on the bus (e.g., a command to alter data stored in the local cache of the bus agents), the master sends an input message to the multiplexer 212 and also sends a request signal to the bus arbiter 210 that controls a multiplexer 212. The multiplexer 212 can receive input messages from the master elements 202, 204, 206, and 208 in a particular order, and the multiplexer 212 can then output the messages to the slave elements 214, 216, 218, and 220 in a particular order, which need not be the same as the order in which the messages were received from the master elements. The arbiter 210 controls, via the multiplexer 212, which of the bus master's signal is placed on the bus at a particular time. If the multiplexer 212 receives more than one request for access to the bus, the arbiter 210 decides the order in which the requests are honored, and the output of the multiplexer 212 is sent to one or more bus slave elements 214, 216, 218, and 220, which can be separate elements or part of a receiving side of one of the bus masters 202, 204, 206, and 208.

The shared bus controller 200 shown in FIG. 2 can be used in computer systems, for example, to control a Peripheral Component Interconnect ("PCI") bus, which is used in many personal computers. However, such bus arbiter systems operate at relatively low speeds due to the need for the complex logic associated with the bus arbiter, and therefore generally are not used as part of a SOC type of chip.

Figure 3:
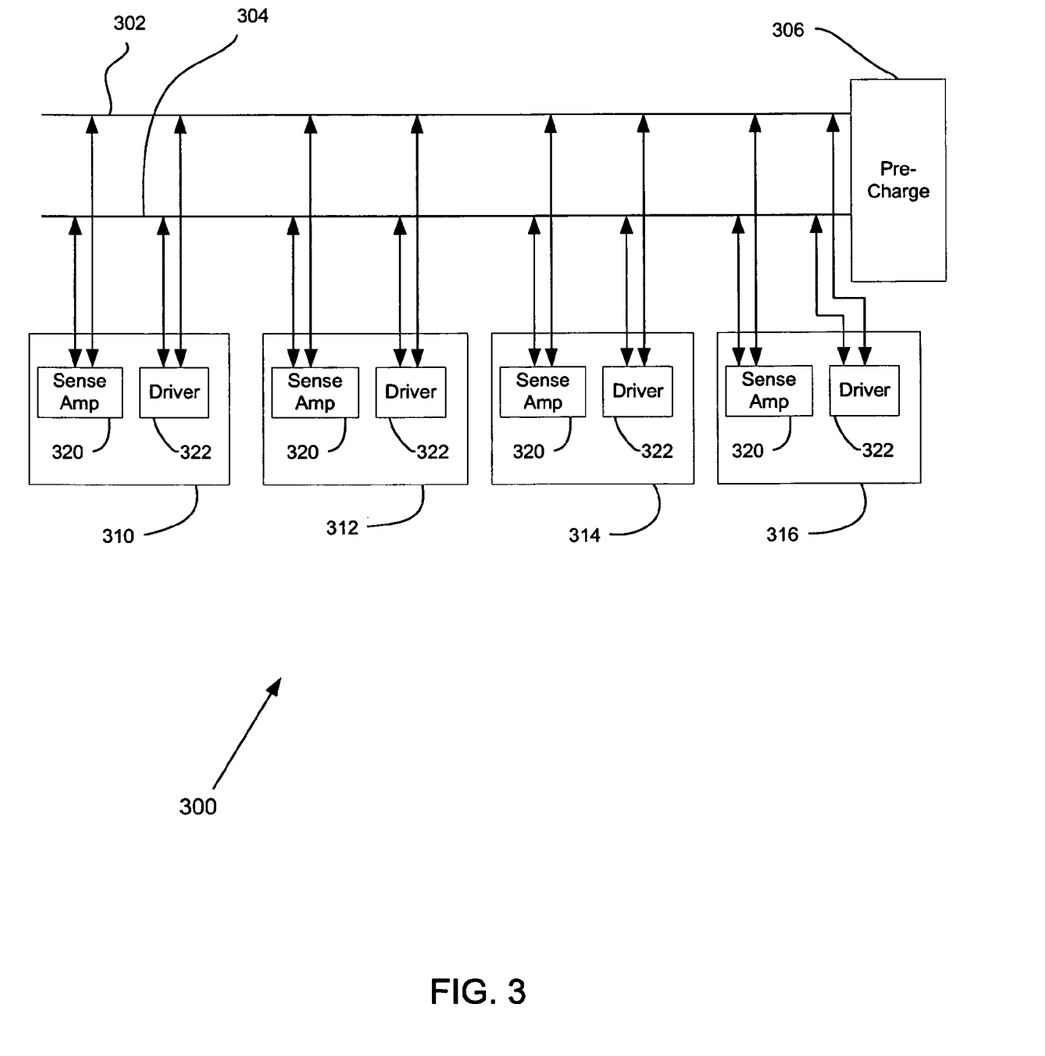
FIG. 3 is a block diagram of another shared bus design.

As shown in FIG. 3, another shared bus configuration 300 can be used to operate a bus at relatively high speeds. The shared bus configuration 300 can include a differential signaling system that uses two bus lines 302 and 304 to carry messages between bus agents 310, 312, 314, and 316. The bus lines 302 and 304 are pre-charged by a circuit element 306 (e.g., a battery, a capacitor, a current source, a voltage source, or an integrated circuit element) that ensures that the two bus lines 302 and 304 are charged to a predetermined initial state. Each bus agent 310, 312, 314, and 316 connected to the bus lines 302 and 304 of the bus can have two circuit elements connected to bus line: a driver 322 that places signals on the lines 302 and 304; and a sense amp 320 that detects signals on the bus. Although only one pair of lines 302 and 304 is shown in FIG. 3, other implementations could use a larger number of lines (e.g., 32, 64, or 128 pairs of bus lines, or even more) in parallel to allow for high data transfer rates between the bus agents 310, 312, 314, and 316.

When a bus agent 310 needs to communication information to other bus agents 312, 314, and 316 on the bus, the bus agent 310 activates its driver 322, which changes the state of the charge on lines 302 and 304, for example, by drawing charge away from the lines 302 and 304, thus causing a voltage a pulse to travel along the lines. The other bus agents 312, 314, and 316 sense the change of state using their sense amp circuits 320. Communication between the bus agents 310, 312, 314, and 316 generally occurs by including in the message placed on the bus information that identifies both the sending bus agent 310 and possibly the one or more bus agents 312, 314, and 316 that are intended to receive the message. Not shown in FIG. 3 is the complex logic that ensures that only one bus agent 310, 312, 314, and 316 at a time is able to place information on the bus lines 302 and 304 and the logical elements that process the information that is placed on the bus lines 302 and 304.

Although messages may be communicated on the bus lines 302 and 304 at high speeds in typical integrated circuit implementations, the speed of the bus can be limited by electrical loading limitations of the lines. In particular, as the bus lines 302 and 304 become longer, the resistance, R, of the wires that make up the bus increases. In addition, the capacitance, C, of the bus wires with respect to their environment also increases with increasing length of the bus lines 302 and 304. Therefore, the RC time constant of the bus increases with the length of the bus lines, which limits the speed at which messages can be communicated on the bus. As more agents are added to the bus and the bus becomes longer.

Figure 4:
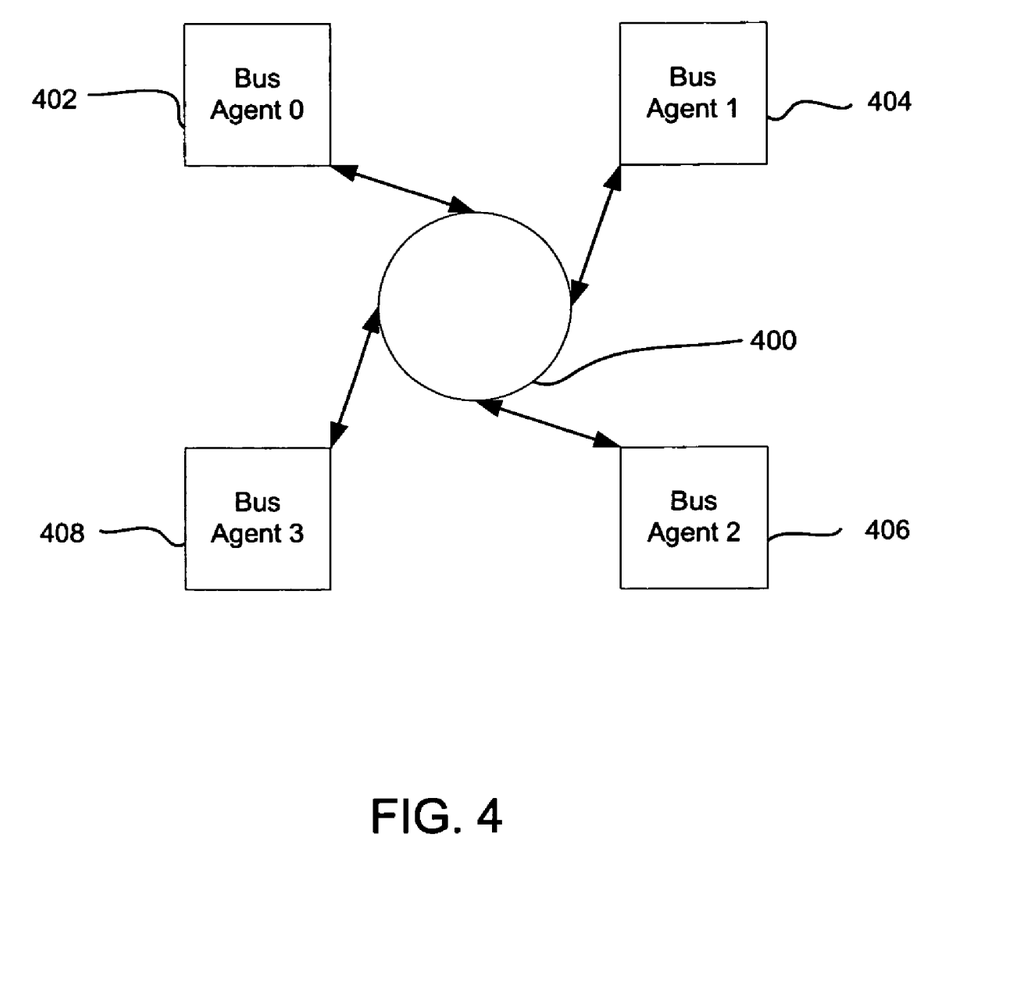
FIG. 4 is a block diagram of multiple bus agents arranged in a ring topology.

Referring to FIG. 4, bus agents 402, 404, 406, and 408 can be arranged in a ring topology, such that they can communicate messages to each other around the ring 400. With the bus agents 402, 404, 406, and 408 interconnected in a ring topology, the agents can communicate faster than when connected on a linear bus, because the physical link between each bus agent can be shorter in the ring topology shown in FIG. 4 than in the linear bus shown in FIG. 3. Thus, the RC time constant limitation on bus speed is reduced in the ring topology, and the bus may run at much higher speeds. However, when the bus agents 402, 404, 406, and 408 are configured in a ring topology and a message is injected into the ring by a bus agent the order in which messages are injected into the ring by different bus agents is not clearly identical to the order in which each bus agent receives the messages established, which can lead to ambiguity and errors in the control of data on the ring and a lack of cache coherence among the bus agents.

Figure 5:
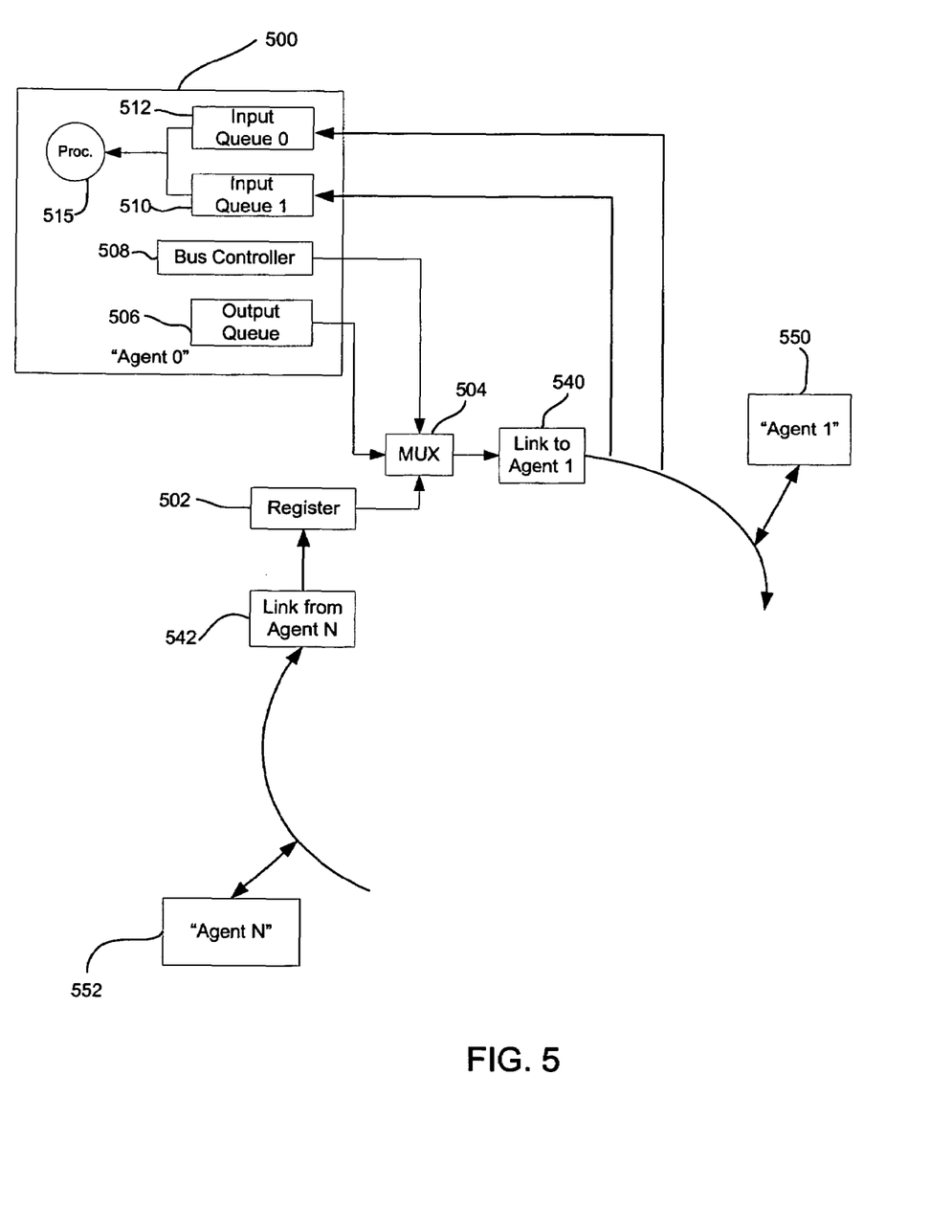
FIG. 5 is a block diagram of an interface between a bus agent and a ring-type bus.

FIG. 5 is a block diagram of an interface between a bus agent 500 ("Agent 0") and a ring-type bus. Although only a single bus agent 500 is shown in FIG. 5, other bus agents can be connected to the ring-type bus, including "Agent 1," 550 to which a link 540 is shown from "Agent 0" 500, and "Agent N" 552, which is linked to "Agent 0" 500 by the link 542. The ring-type bus contains a register 502 that is receives input from another bus agent (e.g., "Agent N") that is connected to the ring. The register 502 is a simple buffer that holds messages received from the previous agent on the bus (e.g., "Agent N" 552), and the register contains at least enough storage to hold a complete message. The register 502 is connected to one input of a multiplexer 504. The multiplexer 504 also receives input from a FIFO output queue 506 that holds messages to be output from the bus agent 500 and placed on the ring-type bus. The output of the multiplexer 504 is connected though link 540 to the register belonging to the next bus agent (e.g., "Agent 1") in the ring. The operation of the multiplexer 504 is controlled by a bus controller 508, which determines when the agent 500 is allowed to place messages from the output queue 506 into the ring and which also performs other supervisory functions described in further detail below. All messages to be sent on the bus are labeled with a binary polarity value of either "0" or "1".

As the bus becomes available to the agent 500, a pending message in the output queue 506 is placed on the ring-type bus. The output of the multiplexer 504 is also sent to two input queues 510 and 512. Input queues 510 and 512 are generally identical, except that one queue 512 is designated for receiving messages from the ring that are designated as having a polarity value of "0", and the other queue 510 is designated for receiving messages from the ring that are designated as having a polarity value of "1". The bus controller 508 examines the polarity value of messages arriving from the ring and determines which of the two input queues 510 or 512 the incoming message is to be placed in. If the bus controller 508 allows a message delivered from the output queue 506 to be passed though the multiplexer 504 and placed onto the bus, then because only one input to the multiplexer 504 can appear at its output, the message input from the register 502 to the multiplexer 504 is dropped from the ring. Hence, any message from a bus agent travels around the ring exactly one. However, if the bus controller 508 allows a message received from the register 502 to be sent to the output of the multiplexer 504, then the message will continue around the ring and will also be stored in the appropriate input queue 510 or 512 based on the polarity value of the message. Of course, any message output from the output queue 506 of a bus agent 500 is also placed into the appropriate input queue 510 or 512. Thus, the input queues of all bus agents receive all messages placed into the ring. The order in which messages are removed from input queue 510 and 512 and delivered to a processor 515 for processing is determined by the polarity of the messages and time at which the message was received, as explained in more detail below.

The polarity values of the messages placed into the ring can be used to determine the order in which messages are injected into the ring and to maintain a cache coherence among the bus agents connected to the ring. First, the number of bus agents connected to the ring is determined and this information is provided to each bus controller 508 of each bus agent. The number of bus agents connected to the ring can be set during the design and construction of the system (e.g., hardwired into the design of a chip) or it may be determined dynamically at the time the system is initialized, as described in more detail below. Once the number of bus agents connected to the ring is determined, a timing chart, a shown in Table 1, indicates how traffic flow on the bus can be managed.

Succeeding rows of the Table 1 indicate activity during succeeding temporal steps of bus activity (e.g., as determined by successive clock cycles) and the time is indicated by the entry in the first column of the table (e.g., t1, t2, . . ., t20). Entries in the columns labeled "Agent 0,""Agent 1," "Agent 2," and "Agent 3" represent a sequence of messages present at each bus agent connected to the ring at a particular time given by the entry in the column labeled "Time." For example, entries in the column labeled "Agent 0" represent the messages present at the register of the zeroth bus agent at the time corresponding to the time at the first row of the chart. The entry in each box of the chart identifies the source of the message present at the input register of the agent identified by the column heading. Thus, an entry of "Sx" represents a message sent by bus agent x, where x can range from 0 to N−1, where N is the total number of bus agents connected to the bus.

TABLE 1

| Time | Agent 0 | Agent 1 | Agent 2 | Agent 3 |
|------|---------|---------|---------|---------|
| t0   | Probe   |         |         |         |
| t1   |         | Probe   |         |         |
| t2   |         |         | Probe   |         |
| t3   |         |         |         | Probe   |
| t4   | Cfg     |         |         |         |
| t5   |         | Cfg     |         |         |
| t6   |         |         | Cfg     |         |
| t7   |         |         |         | Cfg     |
| t8   | S0      |         |         |         |
| t9   |         | S0      |         |         |
| t10  |         | S1      | S0      |         |
| t11  |         |         | S1      | S0      |
| t12  | S0      |         | S2      | S1      |

TABLE 1-continued

| Time | Agent 0 | Agent 1 | Agent 2 | Agent 3 |
|------|---------|---------|---------|---------|
| t13  | S1      | S0      |         | S2      |
| t14  | S2      | S1      | S0      | S3      |
| t15  | S3      | S2      | S1      | S0      |
| t16  | S0      | S3      | S2      | S1      |
| t17  | S1      | S0      | S3      | S2      |
| t18  | S2      | S1      | S0      | S3      |
| t19  | S3      | S2      | S1      | S0      |
| t20  | S0      | S3      | S2      | S1      |

Figure 6:
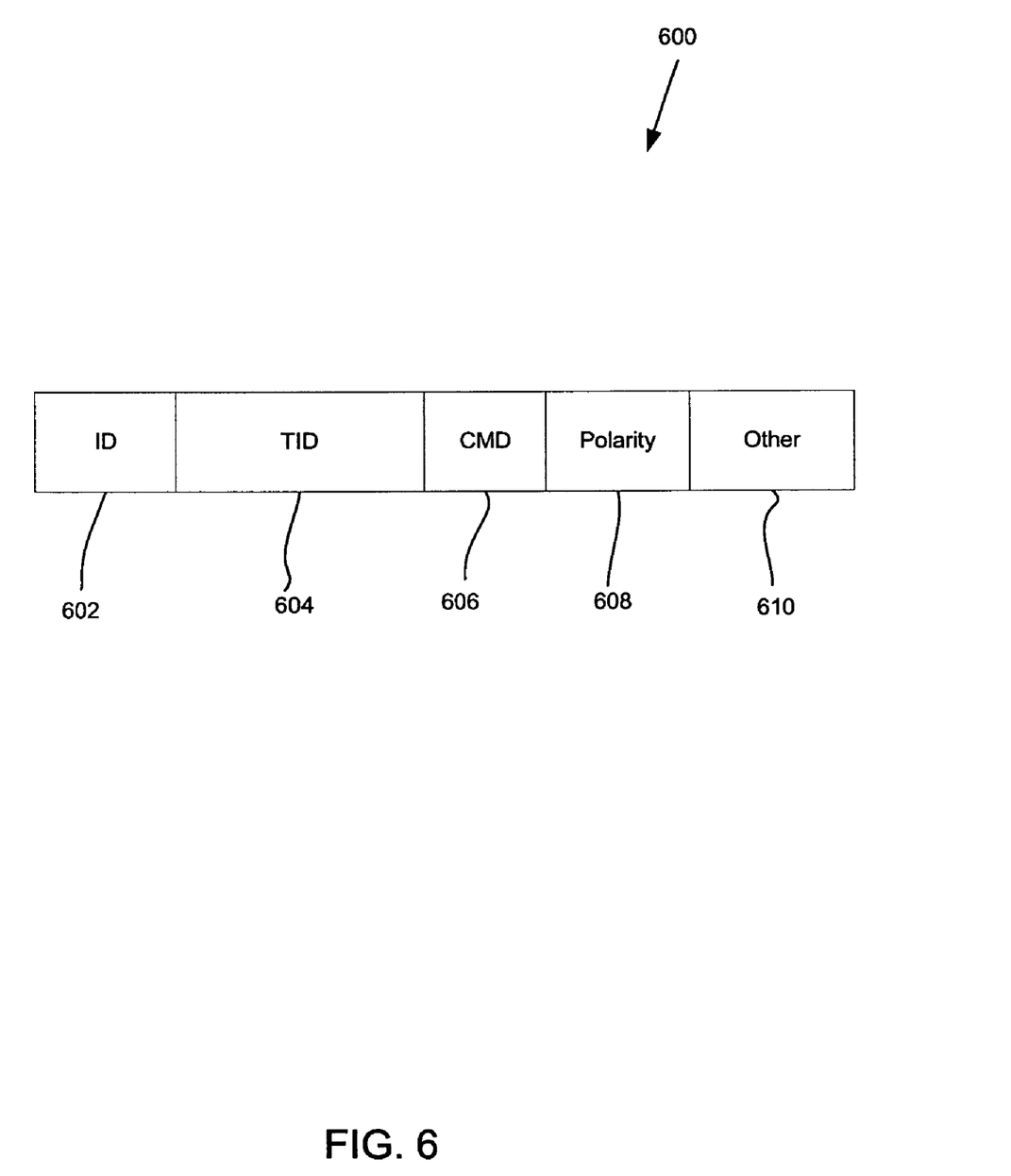
FIG. 6 is block diagram of a format of message injected from a bus agent into a ring-type bus.

As shown in the FIG. 6, message 600 injected into the ring can include data stored in five fields: a Station ID 602 that identifies the ID number of the station that sent the message; a Transaction ID 604 that allows each station to uniquely identify each transaction; a Command 606 that identifies the specific command to be performed by the recipients of the message; and a Polarity value 608 that has the value 0 or 1. The message may also have other fields 610 that are not relevant to the process being described here.

Referring again to Table 1, the first four rows of the table represent an initialization of the bus. The bus controller of an agent (e.g., "Agent 0") that is pre-determined during design of the system, sends out a Probe message at time t0. The message arrives at Agents 1, 2, and 3, in turn, at times t1, t2, and t3. When the message arrives back at Agent 0 at time t4, the message is removed. At this point Agent 0 now knows how many agents are connected to the bus, since it can count the number of cycles that elapse between the time it sent out the configuration message and the time the message returns to Agent 0.

Agent 0 then sends out a Configuration message at time t4. This message contains data about of the number of agents in the ring. As the Configuration message is received by each agent, the agent stores the data about the total number of agents connected to the ring and performs other initialization operations. The initialization procedure including the probe and configuration messages can occur when the system is powered on or reset. Alternatively, the number of bus agents connected to the ring can be determined when the system is designed and information about the number of interconnected bus agents can be hard-wired into the bus agents.

After initialization, during successive time steps (indicated by successive rows in Table 1) consecutive bus agents have the opportunity to inject a message onto the bus during a cycle of bus ring activity. Thus, in one cycle of bus ring activity, each bus agent has the opportunity to inject a message into the ring. Messages injected into the ring by a bus agent are labeled with a polarity value, and on alternate cycles of ring activity the polarity of messages injected into the ring is alternated between "0" and "1." In Table 1, messages having a polarity value of "1" are indicated by bold entries, and messages having a polarity value of "0" are indicated by normal text entries.

Although each agent sees messages arrive in a different order than the order in which the message were actually injected into the ring, the polarity tagging of the messages can be used to order of the message and thereby maintain a cache coherency among the different bus agents. For example, at time t12, Agent 0 injects a message, S0, having a polarity of "0" into the ring while Agent 2 injects a message, S2, having a polarity value of "1." From the perspective of Agent 3 the message, S2, from Agent 2 will arrive at time t13 before the message, S0, from Agent 0, which arrives at time t15, but from the perspective of Agent 1 the message from Agent 0 will arrive before the message from Agent 2. However, because messages are routed into one or more input queues according to their polarities, the messages can be read out of the input queues and into the agent for processing in an order determined by the polarity values of the messages. Thus, even though the messages arrive in different orders at different bus agents, when the messages are sorted by polarity and placed into the FIFO input queues, the output of each queue will be properly ordered and the messages will be processed in the same order by all agents.

For example, messages received by Agent 0 at times t8, t13, t14, and t15 having a polarity value of "1" are read out of the input queue of Agent 0 and processed before the messages received by Agent 0 at times t12, t17, t18, and t19 having a polarity value of "0". Similarly, messages received by Agent 1 at times t8, t13, t14, and t15 having a polarity value of "1" are read out of the input queue of Agent 1 and processed before the messages received by Agent 1 at times t13, t14, t19, and t20 having a polarity value of "0". Thus, messages received by all bus agents are routed for use by the agents in the same sequential order.

Figure 7:
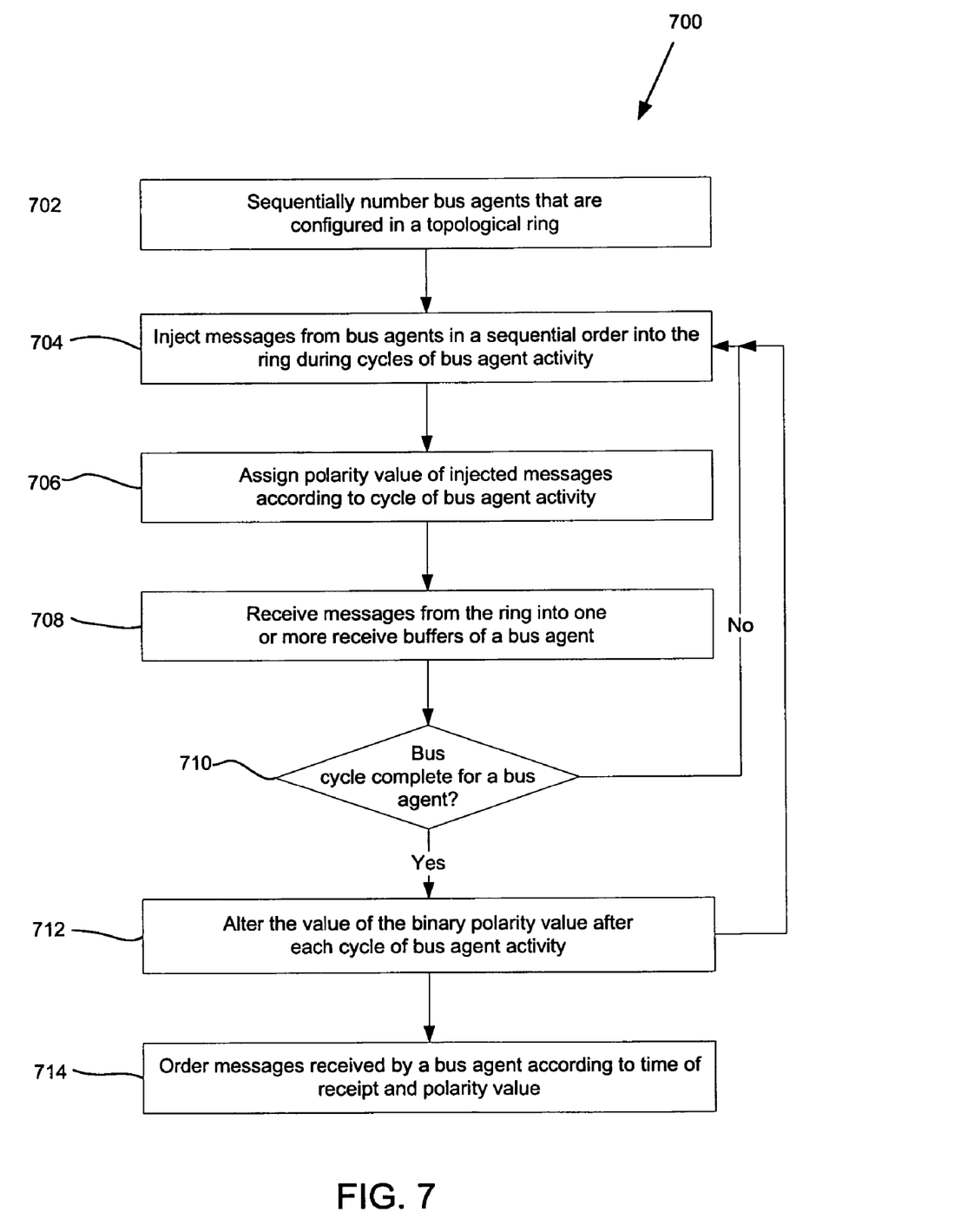
FIG. 7 is a flow chart of a process for managing data traffic on a ring-type bus.

As shown in FIG. 7 a process 700 can be used to manage message traffic on a bus arranged in a ring-type topology to which multiple bus agents are connected. The bus agents are sequentially numbered (step 702). Messages are injected form the bus agents in a sequential order into the ring during cycles of bus agent activity (step 704), and polarity values are assigned to the injected messages according to the cycle of bus agent activity (step 706). When messages are received by a bus agent from the ring, the messages are buffered in one or more receive buffers of the bus agent (step 708). If the bus cycle is not complete for a bus agent (query 710), the messages continue to be injected from the bus agent into the ring with the same polarity value. If the bus cycle is complete (query 710), then the binary polarity value of the injected message is altered (step 712). Finally, the messages received by the bus agent in the one or more receive buffers are ordered according to the time of receipt and the polarity value of the message (step 714).

Figure 8:
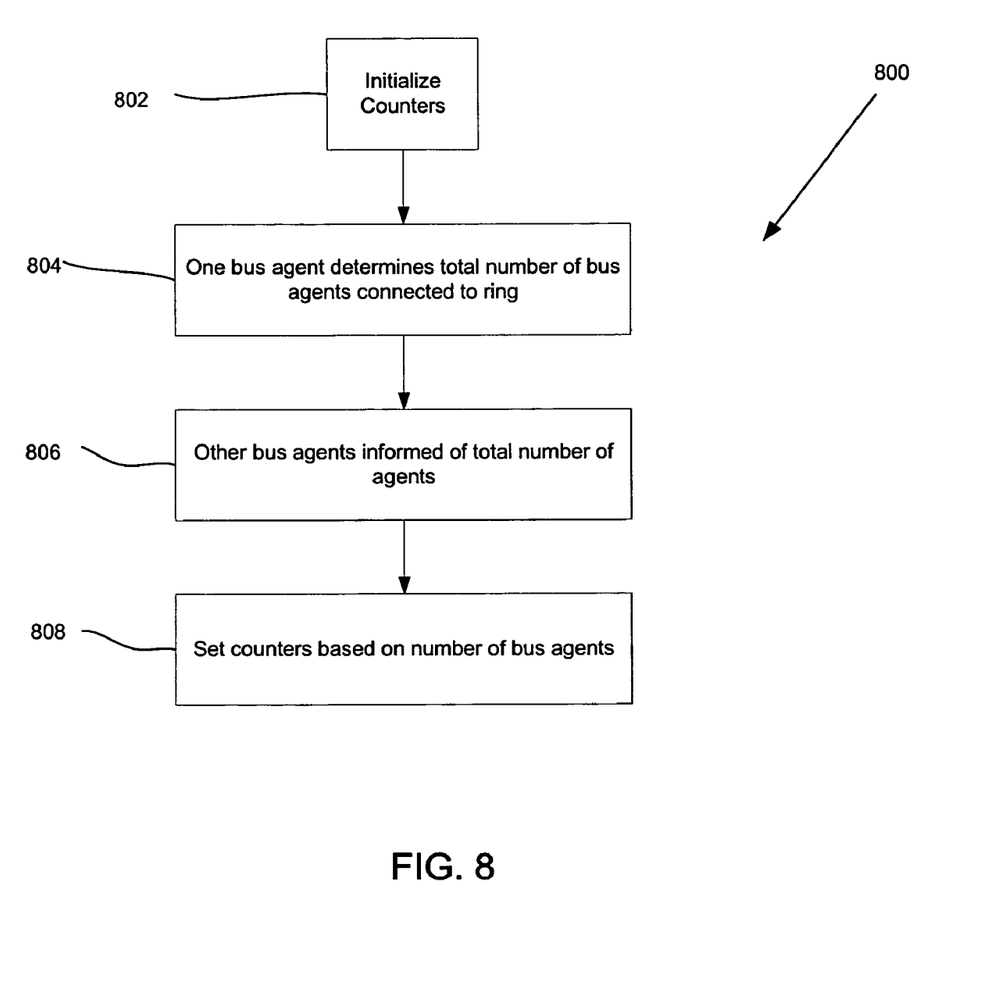
FIG. 8 is a flow chart of a process for initializing bus agents connected to a ring-type bus.

Referring to FIG. 8, a process 800 for initializing the bus agents (e.g., Agent 0, Agent 1, . . . , Agent N) that are connected to the ring-type bus can be used to prepare the bus agents for use in the system. In this process 800, the bus controller of each bus agent maintains a number of registers, counters, and flags to keep track of the state of the bus agent: an ID register holds the ID number of the bus agent (i.e., a sequential number beginning from zero indicating the order of the bus agents around the ring); an N register holds the number of agents that are connected to the ring; a WTC counter is maintained for controlling a write training cycle used to train the bus agents to write messages to the ring; a RTC counter is maintained for controlling read training cycle used to train the bus agents to read messages from the ring; a CTF counter maintains a count of the current time frame; a RP pointer is maintain to point to the place in the read queue from which the next incoming message will be read; a WP pointer is maintained to point to the place in the read queue where the next incoming message will be written; a CRQ flag indicate which of the two input queues is currently active; and a CP flag indicate the current polarity value ("0" or "1") of the bus agent. All of the counters count from 0 up to N−1, and wrap around when they reach N−1; that is, they count from 0 modulo N.

When the system is powered-on or reset, all the counters of the bus agents are initialized (e.g., they are set to zero) (step 802). After initialization of the bus agents, all agents except Agent 0 remain silent, but Agent 0 sends out a probe message and waits for the probe message to return while counting clock cycles of the bus to determine the number of bus agents connected to the bus (step 804).

After Agent 0 has determined the number of bus agents connected to the ring, Agent 0 sends out a configuration message that contains information about the number of bus agents, N, to the other bus agents (step 806). The other agents listen on the bus but do not send anything at this time. When the configuration message is received by another agent the counters of the other agent are set determined (step 808). For example, the N register is set to equal the total number of bus agents on the ring (N). The WTC counter is set to equal N+ID−1, and the RTC counter is set to equal 2*N+ID+1, while the other counters are set to zero. The settings of these counters allow each station to be properly synchronized and ensure that its polarity settings are consistent with the other agents. Agent 0 waits until the configuration message returns, at which point the initialization is complete.

After the WTC counter of the bus agents is set equal to N+ID−1 it counts down by 1 during each clock cycle on the bus, and the bus agent is prevented from writing messages to the ring until WTC=0, which ensures that each bus agent will not inject any messages into the ring in an invalid order. Similarly, after the RTC counter is set to 2*N+ID+1 it is counted down by 1 during each clock cycle of the bus and the bus agent is prevented from reading messages from the ring until RTC=0, which ensures that each bus agent will begin writing messages to the ring only at the appropriate time.

The CTF counter remains at 0 until a station is able to send messages (i.e., after the WTC counter counts down to 0). After this, at each clock cycle, the CTF counter is incremented. However, the CTF counter counts modulo N; that is, a count of N−1 is followed by a count of 0. The logic used in the bus agent will allow an agent to inject messages into the ring only when its CTF is equal to 0.

Figure 9:
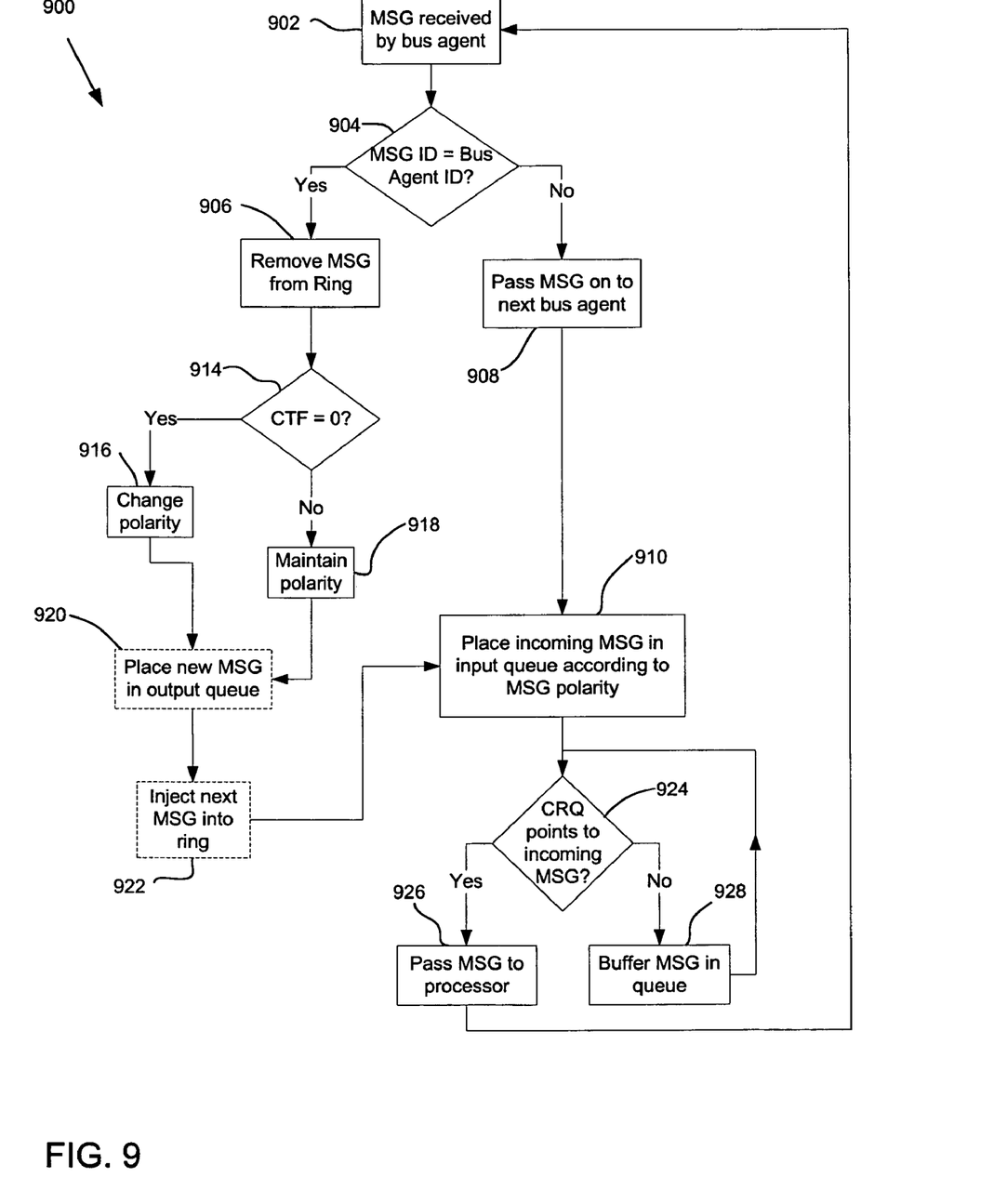
FIG. 9 is a flow chart of a process for handling messages received by a bus agent connected to a ring-type bus.

As shown in FIG. 9, once the initialization phase is completed and the counters of all the bus agents have been set, a complete bus cycle is initiated at each cycle of ring operation. A new incoming message is received by a bus agent (step 902) from the ring, and the message is examined. The message ID identifying the bus agent that sent the message is checked, and if the message ID is equal to the ID of the agent that receives the message (query 904), then the message is removed from the ring (step 906), since every other agent on the bus has already received the message. If the message ID is not equal to the ID of the receiving agent, then the received message is a new message sent by another agent, and the message can be passed on to the next bus agent (step 908). The new message is accepted and placed into the input queue whose polarity corresponds to the polarity of the message (step 910). The message is placed into the input queue at the location pointed to by the WP counter. After this, the WP counter is incremented by 1, modulo N.

For those clock cycles in which the ID of the incoming message corresponds to the ID of the receiving bus agent (query 904), the agent can send out new messages. The agent checks if the CTF counter is equal to 0 (query 914), and, if so, the polarity used to label outgoing messages is flipped (step 916) (i.e., if the polarity is "0," it is changed to "1," and if it is "1" it is changed to "0"). Otherwise the polarity value is maintained (step 918). The agent then places a new output message in the output queue is empty (step 920). Then, if the output queue is not empty the next message in the output queue is injected into the ring (step 922) and copied simultaneously into the input queue at the place pointed to by the WP counter, while the WP counter is incremented by 1 modulo N.

Then, if the input message in the input queue is pointed to by the CRQ pointer (queue 924) it is passed to the processor of this agent for processing (step 926). The message is taken from the queue at the place pointed to by the Read Pointer RP. After this, the Read Pointer is incremented by one, modulo N. If the CRQ pointer does not point to the input message, then the message is buffered in the input queue (step 928) for later processing and will be taken out of the input queue and passed to the processor when the CRQ does point to the message. At every cycle, the bus agent delivers any message in the entry pointed by the RP of the current input queue CRQ. After the message is delivered to the processor of the agent and dequeued from the CRQ, the RP value is incremented by one, modulo N. If the new RP value is 0 and the input queue pointed by CRQ has a polarity of 1, the CRQ is changed to point to the other input queue having a polarity of "0." If the new RP value is 0 and the input queue pointed by CRQ has a polarity of 0, the CRQ is changed to point to the other input queue having a polarity of "1.")

A Bus Controller designed as described herein can ensure cache coherence of all bus agents. This is because, regardless of the order in which messages arrive at each agent, the design of the controller and its associated queues and counters ensures that the messages are examined by the processor of each bus agent in the order in which they were sent, and this order is the same for all agents on the bus.

Although the discussion herein has been focused on the control and command paths for the bus, the data paths can follow a parallel ring structure or they can be implemented using alternative structures such as a crossbar switch mechanism, a traditional data bus, or other methods.

Furthermore, although the description herein has been cast in terms of an implementation on a multiprocessor system on a chip, it is not limited to such an implementation. Indeed, the designs and processed described herein could be implemented in hardware to allow the interconnection of independent computing platforms, for example.

Implementations of the various techniques described herein may be implemented in digital electronic circuitry, or in computer hardware, firmware, software, or in combinations of them.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. The processor and the memory may be supplemented by, or incorporated in special purpose logic circuitry.

While certain features of the described implementations have been illustrated as described herein, modifications, substitutions, and changes can be made. Accordingly, other implementations are within scope of the following claims.

What is claimed is:

1. A method of managing data traffic among three or more bus agents configured in a topological ring, the method comprising:

numbering each bus agent sequentially;

injecting messages from the bus agents into the ring in a sequential order according to the numbering of the bus agents during cycles of bus agent activity, wherein the messages comprise a binary polarity value;

receiving messages from the ring into two or more receive buffers of a receiving bus agent;

alternating the value of the binary polarity value after succeeding cycles of bus ring activity; and ordering the received messages for processing by the receiving bus agent based on the polarity value of the messages and a time at which each message was received.

2. The method of claim 1, wherein numbering each bus agent sequentially comprises:

automatically determining the number of bus agents configured in the topological ring; and automatically assigning a number to each bus agent.

3. The method of claim 2, further comprising determining the number of bus agents during a start-up process of a system comprising the three or more bus agents.

4. The method of claim 1, wherein numbering each bus agent sequentially comprises reading a number from each bus agent.

5. The method of claim 1, wherein receiving messages into one or more receive buffers of the receiving bus agent comprises:

receiving messages having a first binary polarity value into a first receive buffer; and receiving messages having a second binary polarity value into a second receive buffer.

6. The method of claim 5, further comprising:

extracting messages received during one cycle of bus ring activity from the first receive buffer; and then extracting messages received during a successive cycle of bus ring activity from the second receive buffer.

7. The method of claim 1, further comprising generating a common clock signal, and wherein injecting messages from the bus agents into the ring in the sequential order comprises injecting messages into the ring synchronously with the common clock signal.

8. The method of claim 1, injecting messages from the bus agents into the ring in the sequential order comprises injecting messages into the ring asynchronously.

9. The method of claim 1, wherein ordering the received messages for processing by the receiving bus agent comprises ordering messages having a first polarity value received during two successive cycles of bus ring activity before messages having a second polarity value received during the successive cycles of bus ring activity.

10. The method of claim 1, further comprising ordering the messages received by each bus agent in the same order.

11. The method of claim 1, wherein at least three bus agents comprise a processor and a local cache.

12. The method of claim 1, wherein the bus agents are located in a system-on-a-chip.

13. A system of three or more bus agents interconnected in a topological ring configured to deliver messages between bus agents, each bus agent comprising:

an output queue configured for buffering messages to be injected into the ring for transmission to other bus agents;

a first input queue configured to receive and buffer messages from the ring;

a bus controller configured to tag a binary polarity value to messages injected into the ring, wherein the polarity value alternates between the binary value with succeeding cycles of bus ring activity; and a processor configured to order messages received from the ring in the input queue based on the polarity value of the messages and time at which the messages were received.

14. The system of claim 13, wherein each bus agent further comprises a register configured to store a unique, sequential identification of the bus agent.

15. The system of claim 13, wherein each bus agent further comprises a register configured to store information about the number of agents connected o the bus.

16. The system of claim 13, further comprising a second input queue configured to receive and buffer messages from the ring, wherein the first input queue is configured to receive and buffer messages tagged with the first binary polarity value, and the second input queue is configured to receive and buffer messages tagged with the second binary polarity value.

17. The system of claim 13, wherein each bus agent comprises a processor and a local cache.

18. The system of claim 17, wherein the bus agents are located in a system-on-a-chip.

19. The system of claim 13, wherein the bus controller of each bus agent is further configured to inject a message only once per cycle of bus ring activity.

20. The system of claim 13, wherein the bus controller of at least one bus agent is further configured to query the bus agents connected to the ring and determine automatically the number of bus agents connected to the ring.

* * * * *